C. A. WENDELL.
COAL WASHING JIG.
APPLICATION FILED FEB. 21, 1916.
Reissued Apr. 25, 1916.
14,121.
2 SHEETS—SHEET 1.
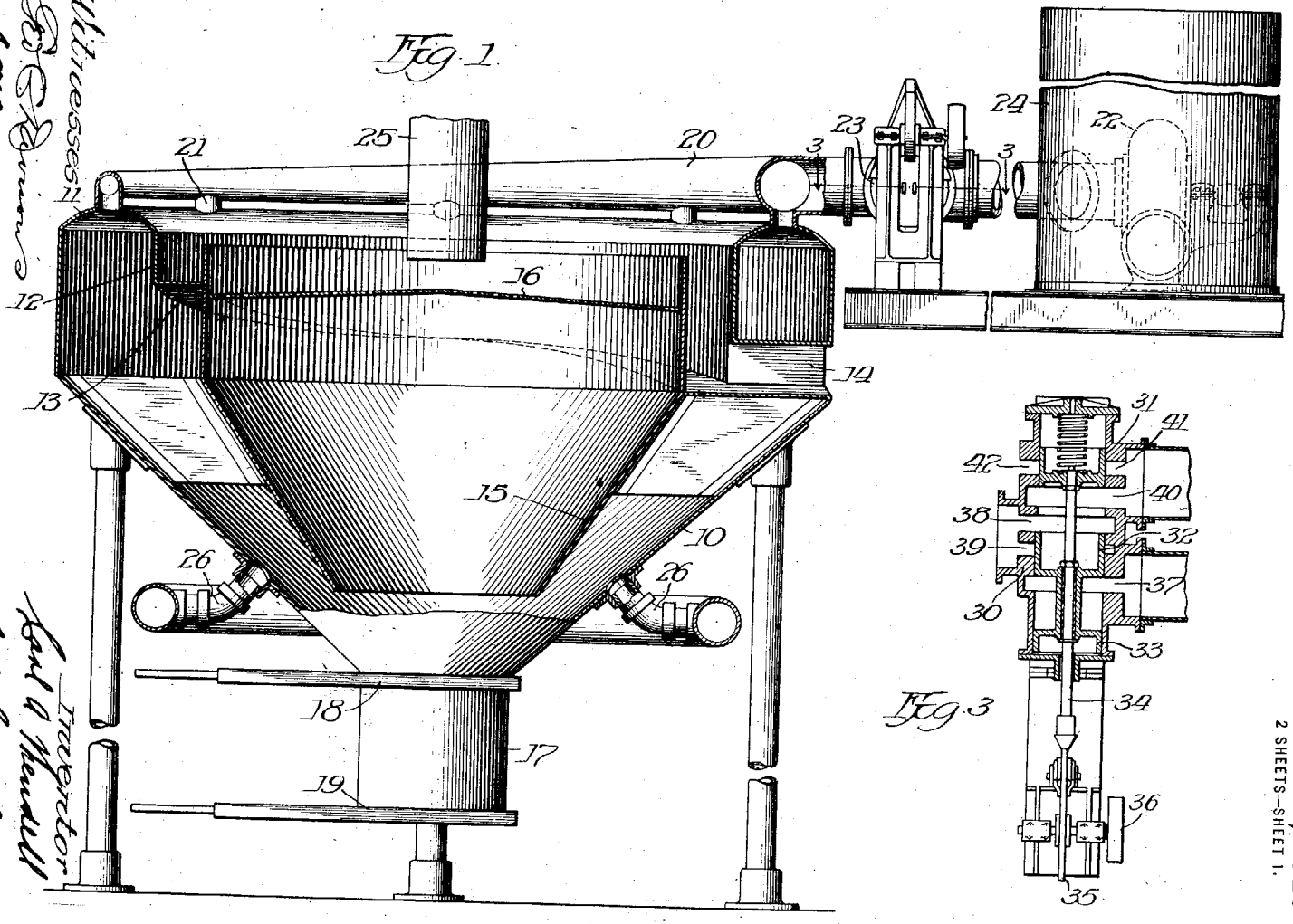
Witnesses
Geo. C. Devins
C. F. Morrey
Inventor
Carl A. Wendell
By C. C. Linthicum
Atty.

C. A. WENDELL.
COAL WASHING JIG.
APPLICATION FILED FEB. 21, 1916.
Reissued Apr. 25, 1916.
14,121.
2 SHEETS—SHEET 2.
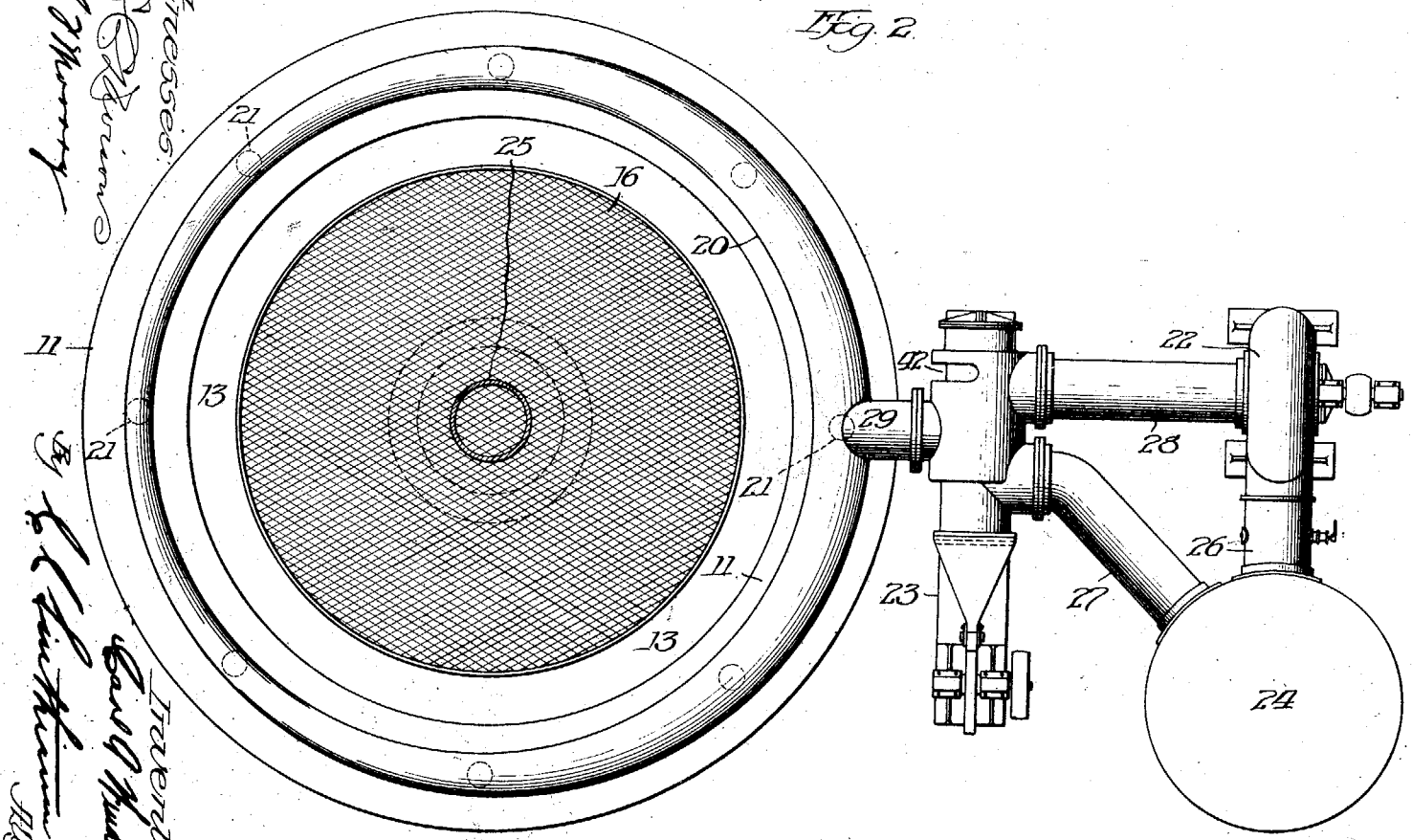
Witnesses:
Geo. C. Rivion
C. F. Morrey
Inventor
Carl A. Wendell
By G. C. Linthicum
Atty.

UNITED STATES PATENT OFFICE.

CARL A. WENDELL, OF JOLIET, ILLINOIS.

COAL-WASHING JIG.

14,121. Specification of Reissued Letters Patent. Reissued Apr. 25, 1916.

Original No. 1,163,292, dated December 7, 1915, Serial No. 12,918. Application for reissue filed February 21, 1916. Serial No. 79,768.

*To all whom it may concern:*

Be it known that I, CARL A. WENDELL, a citizen of the United States, and resident of Joliet, in the county of Will and State of Illinois, have invented certain new and useful Improvements in Coal-Washing Jigs, of which the following is a specification.

My invention relates to apparatus for washing coal and has particular reference to a novel jig or concentrator in which air and water are utilized to cause separating action.

An object in the construction of the present device is to eliminate all bearings, pistons, belting, shafting, etc., and to cause the agitation of the coal by changes in the level of the water used in the washing action.

A further object is to construct such a device which shall occupy a comparatively small space but which will handle a large tonnage; a device in which vibration is eliminated and the stresses equally distributed thereby making possible a much lighter construction; a device in which the commonly employed mechanism is dispensed with, with the resultant economy in horse power and upkeep. The construction shown in the present application relies upon a pulsating action of the water within the jig for the purpose of agitating the material and causing the separation of the slate from the coal. Preferably the coal to be washed is crushed and is laid onto the screen which is covered with pieces of feldspar of a size considerably greater than the mesh of the screen. The water within the container is then given a pulsating action which causes the coal and slate to stratify, the slate being heavier than the coal. Likewise on account of its weight the slate or refuse works through the feldspar bed and through the screen, the washed coal being discharged with the water.

The invention will be more readily understood by reference to the accompanying drawings, wherein, Figure 1 is an elevation partly in section showing a jig constructed in accordance with my invention; Fig. 2 is a plan view of the same, and, Fig. 3 is a sectional view of the valve.

Referring to the drawings it will be seen that I provide an outer cylindrical casing in the form of a hopper 10, at its lower end and in the form of a dome 11, at its upper end. The metal of the dome extends downwardly from its inner edge, as at 12, and terminates in a downwardly inclined chute 13, the lower end of the chute opening into a discharge outlet 14, for the water and washed coal. On the interior of the outer shell is an inner shell 15, across the top of which a screen 16, is placed. The lower end of the inner shell is open and registers with an outlet 17, controlled by the gate valves 18, 19. An air conduit 20, is located above the dome 11, and communicates with the interior thereof by means of short tubes 21, equally spaced around the device. An exhaust fan 22, acting in conjunction with a suitable valve 23, and a tank 24, provides for an intermittent pneumatic action upon the water in the jig. The pulsating action of the water is secured by the employment of air pressure inducing means, such as the fan 22, which communicates by a short conduit 26, with the equalizing tank 24. A conduit 27, connects the tank to the valve 23, the details of which are shown in Fig. 3. A similar conduit 28, connects the fan with the valve; the connection between the valve and the main, or conduit 20, of the coal washing jig is in the form of a short tubular connection 29. The details of the valve, as shown in Fig. 3, include a casing 30, within which is mounted a three-part piston 31, 32, 33, all actuated by a single stem 34, the same being caused to reciprocate by a cam 35, actuated by a belt pulley 36, connected to a suitable source of power. The casing is provided with a port 37, communicating with the conduit 27, ports 38, 39, communicating with the conduit 29, and the main 20, ports 40, 41, communicating with the supply conduit 28, and the port 42, communicating with the atmosphere. In the position shown in Fig. 3, the air is being drawn out of the mains 20, 29, into the exhaust fan 22, for the reason that the ports 38, 40, are in communication. The pressure developed at this stage by the fan is accommodated by the equalizing tank 24, the outlet from the tank being closed by the position of the piston 32. When the piston is shifted to a reverse position, the port 38, is closed and the ports 37 and 39 are in communication, whereby the pressure accumulated in the equalizer tank is directed into the main and not only restores the pressure in the main to atmospheric but preferably raises the pressure slightly thereabove. In this position of the parts the supply conduit 28, is open to the atmosphere because the ports 40, 42, are in communication, thus furnishing a supply of air at atmospheric pressure to the blower which is forced into the equalizing tank in readiness for further use. The details of this valve are disclosed and claimed in my copending application, Serial No. 12,920, filed March 9, 1915.

Coal is supplied through the inlet 25, to the surface of the screen 16, a bed of feldspar or similar material having previously been placed on the screen. Water is admitted through the pipes 26, and fills the inner and outer shells until it overflows the top of the inner shell. The fan having been started the valve controls the air pressure in such manner as to intermittently reduce the air pressure in the dome and restore the pressure to atmospheric and even raise it above atmospheric pressure. The fan 22 being an exhaust fan withdraws the air from the outer shell of the coal washer and delivers it into tank 24. The delivering of this air into tank 24, gradually fills said tank and raises the pressure of the air contained in the tank to a few ounces above atmospheric pressure. Valve 23, which is covered in the copending application referred to above, is adapted to alternately open and close the pipe to the fan and to the tank so that when the valve is in a position to close the pipe to the fan the passage from the tank to the shell of the washer is open, and the air in the tank 24 thus escapes into the outer shell of the washer. This air being under pressure of a few ounces above atmospheric, is sufficient to cause a downward movement of the water in the outer shell. Hence an upward movement of the water through the inner shell. When the valve is in a position to close the opening from tank 24, the opening from the fan 22 is opened and the fan 22 withdraws the air from the outer shell of the washer, thus causing an upward movement of the water in the outer shell and consequent downward movement of the water in the inner shell, thereby imparting to the water in the inner shell the necessary agitation for the washing of the coal on the screen 16. This causes a vertical reciprocation of the water within the dome and a consequent pulsation or vertical reciprocation of the water in the inner shell and likewise the agitation of the coal which rests upon the screen. As this coal is agitated the heavier materials such as slate are filtered down through the feldspar bed and the screen and dropped into the lower portion of the shell from which such refuse is removed as required by manipulating the valves 18, 19, and without stopping operations. Preferably the area of the screen bed is substantially the same as the area of the dome and therefore the displacement of water in the inner shell will be equal to the displacement in the dome.

By the use of the construction shown it will be seen that the agitation of the material is caused with a minimum of loss due to friction the air and water developing practically the entire friction loss and this loss, of course, is comparatively small. Thus it is found that a washing apparatus of a capacity considerably greater than the machines at present in operation may be constructed with a horse power consumption very much less than heretofore thought possible.

Obviously the construction is capable of several modifications and such modifications as are within the scope of my claims I consider within the spirit of my invention.

I claim:

1. In a coal washing apparatus, the combination of inner and outer shells each of which is adapted to contain water, the pressure on the surface of the water in the inner and outer compartments being substantially balanced, means for supporting a body of material to be washed within the inner shell, and pneumatic means for causing an alternate reduction of pressure below atmospheric and increase of pressure above atmospheric and thereby causing pulsating action to the water in the inner compartment and therefore an agitation of the material therein, substantially as described.

2. In a coal washing apparatus, the combination of adjacent water containers, means within one of said containers for supporting a bed of material to be washed, pneumatic means acting upon the surface of the water within one container and means for causing a pulsation of said pneumatic means whereby the pressure is alternately changed from positive to negative whereby the material is agitated and the portions of different specific gravity caused to stratify, substantially as described.

3. In a coal washing apparatus, the combination of adjacent shells, means for sealing the top of one of said containers whereby the air pressure on the water therein may be reduced and the elevation of the water within said container changed thereby, means in the other container for supporting a bed of material to be washed, and means for repeatedly changing the pressure conditions in the sealed container from above to below atmospheric whereby the liquid in the other container is alternately reciprocated and the material thereby agitated.

4. In a coal washing device, the combination of a pair of concentrically located containers the top of one of which is sealed to the atmosphere, a screen near the top of the other container, pneumatic means communicating with the sealed container and acting upon the surface of the liquid therein, said pneumatic means being arranged to cause pulsations of the liquid within the sealed container by means of intermittently changing the air pressure from above atmospheric to below atmospheric and consequently the agitation of the liquid and materials in said inner container, substantially as described.

5. In a washing apparatus for granular material, the combination of a pair of concentrically arranged containers, means for sealing the top of the outer container to the atmosphere, the top and bottom of said inner container being open, a screen within said inner container, means for causing a periodic change in pressure conditions on the water within said sealed container by changing said pressure from above to below atmospheric and consequently an agitation of the water within said inner container, means for delivering to said screen the material to be washed and for discharging the washed material over the edge of said inner container due to the agitation caused by the water.

CARL A. WENDELL.

Witnesses:
W. C. Fry, Jr.,
Thomas J. Sampson.

Copies of this patent may be obtained for five cents each, by addressing the "Commissioner of Patents, Washington, D. C."